United States Patent
Chen et al.

(10) Patent No.: US 7,504,166 B2
(45) Date of Patent: Mar. 17, 2009

(54) MAGNETIC RECORDING MEDIA HAVING FIVE ELEMENT ALLOY DEPOSITED USING PULSED DIRECT CURRENT SPUTTERING

(75) Inventors: Charles Changqing Chen, Milpitas, CA (US); Thanh Thien Ha, San Jose, CA (US); Abebe Hailu, San Jose, CA (US); Taesun Ernest Kim, San Jose, CA (US); Mariana Rodica Munteanu, Santa Clara, CA (US); Steve Kuo-Hsing Hwang, San Jose, CA (US)

(73) Assignee: Seagate Technology LLC, Scotts Valley, CA (US)

( * ) Notice: Subject to any disclaimer, the term of this patent is extended or adjusted under 35 U.S.C. 154(b) by 406 days.

(21) Appl. No.: 10/856,209

(22) Filed: May 27, 2004

(65) Prior Publication Data

US 2004/0253486 A1 Dec. 16, 2004

Related U.S. Application Data

(60) Provisional application No. 60/479,217, filed on Jun. 16, 2003.

(51) Int. Cl.
*G11B 5/66* (2006.01)
(52) U.S. Cl. .................................................. 428/827
(58) Field of Classification Search .................. None
See application file for complete search history.

(56) References Cited

U.S. PATENT DOCUMENTS 6,610,424 B1 * 8/2003 Acharya et al. ............. 428/830
6,682,834 B2 * 1/2004 Okuyama et al. ......... 428/832.2
6,830,837 B2 * 12/2004 Kanbe et al. ............. 428/811.2

\* cited by examiner

*Primary Examiner*—Holly Rickman
(74) *Attorney, Agent, or Firm*—Shumaker & Sieffert, P.A.

(57) ABSTRACT

CoCrPtB is a conventional material used in some of the layers of a thin film magnetic media structure used for recording data in data storage devices such as hard drives. Typically the CoCrPtB layers used for magnetic media have high Cr and low B in bottom magnetic layers and low Cr and high B in top magnetic layers. In accordance with one embodiment of this invention and to improve media electrical performance, fifth elements, such as Ta, Nb and Hf, etc. were added to the CoCrPtB materials, resulting in CoCrPtB—X, to enhance the grain segregation. The five element CoCrPtB—X layers were deposited using a pulsed direct current sputter technique instead of conventional direct current sputtering techniques. The resulting magnetic media structure having CoCrPtB—X alloy layers exhibits an increase in coercivity Hc and improvement in recording performance.

13 Claims, 6 Drawing Sheets

MAGNETIC RECORDING MEDIA HAVING FIVE ELEMENT ALLOY DEPOSITED USING PULSED DIRECT CURRENT SPUTTERING

This application claims priority from U.S. provisional application Ser. No. 60/479,217 filed on Jun. 16, 2003.

BACKGROUND OF THE INVENTION

1. Field of the Invention

The present invention relates generally to the field of disc drive storage, and more particularly to multilayer magnetic media used in data storage devices.

2. Description of the Related Art

Conventional disc drives are used to magnetically record, store and retrieve digital data. Data is recorded to and retrieved from one or more discs that are rotated at more than one thousand revolutions per minute (rpm) by a motor. The data is recorded and retrieved from the discs by an array of vertically aligned read/write head assemblies, which are controllably moved from data track to data track by an actuator assembly.

The three major components making up a conventional hard disc drive are magnetic media, read/write head assemblies and motors. Magnetic media, which is used as a medium to magnetically store digital data, typically includes a layered structure, of which at least one of the layers is made of a magnetic material, such as CoCrPtB, having high coercivity and high remnant moment. The read/write head assemblies typically include a read sensor and a writing coil carried on an air bearing slider attached to an actuator. This slider acts in a cooperative hydrodynamic relationship with a thin layer of air dragged along by the spinning discs to fly the head assembly in a closely spaced relationship to the disc surface. The actuator is used to move the heads from track to track and is of the type usually referred to as a rotary voice coil actuator. A typical rotary voice coil actuator consists of a pivot shaft fixedly attached to the disc drive housing closely adjacent to the outer diameter of the discs. Motors, which are used to spin the magnetic media at rates of higher than 1,000 revolutions per minute (rpm), typically include brushless direct current (DC) motors. The structure of disc drives is well known.

Magnetic media can be locally magnetized by a read/write head, which creates a highly concentrated magnetic field that alternates direction based upon bits of the information being stored. The highly concentrated localized magnetic field produced by the read/write head magnetizes the grains of the magnetic media at that location, provided the magnetic field is greater than the coercivity of the magnetic media. The grains retain a remnant magnetization after the magnetic field is removed, which points in the same direction of the magnetic field. A read/write head that produces an electrical response to a magnetic signal can then read the magnetization of the magnetic media.

Magnetic media structures are typically made to include a series of thin films deposited on top of aluminum substrates, ceramic substrates or glass substrates. FIG. 1 illustrates a conventional magnetic media structure having a substrate 105 made of aluminum with nickel phosphorous (NiP) coating, a first layer 110 made of chromium (Cr), a second layer 120 made of chromium-tungsten (CrW), chromium-molybdenum (CrMo), or chromium-titanium (CrTi), a third layer 130 made of cobalt-chromium (CoCr), cobalt-chromium-tantalum (CoCrTa), or cobalt-chromium-ruthenium (CoCrRu), a fourth layer 140 made of cobalt-chromium-platinum-boron (CoCrPtBo), a fifth layer 150 made of a material having a high magnetic saturation Ms alloy, and a sixth layer 160 which acts as an overcoat and is typically made of a carbon containing material.

The magnetic media structure described with reference to FIG. 1 above is made using conventional magnetic media manufacturing processes. Conventional media manufacturing processes typically start by cleaning the substrate 105 and then texturing the substrate. Typically the substrate 105 is made of aluminum with a nickel phosphorous coating that acts as a hard surface that can be textured. After the substrate has been textured it is usually cleaned again before the subsequent layers are deposited on top. The deposition process includes sputtering target material of usually the same material as their respective layers so that thin films of the sputtered material grow on the substrate. The deposition process is usually done either at ambient temperatures or at elevated temperatures and only after the deposition chamber has been evacuated to low pressures. Multilayer longitudinal media is typically deposited at elevated temperatures in order to achieve desirable magnetic properties.

The magnetic layers of the structure can be used for perpendicular or longitudinal recording media, which include a single or a couple of magnetic layers wherein the thickness of each layer can range from about 10 Å to about several hundred angstroms, are typically deposited onto substrates that have been heated to high temperatures, such as 250° C. Growing thin films on hot substrates reduces noise by promoting desired crystallographic orientations and by enhancing Cr segregation into grain boundaries. During deposition, the higher substrate temperature enhances molecule mobility permitting desired crystallographic orientations to grow and enhancing Cr segregation into grain boundaries reduces exchange coupling of the grains reducing noise.

In addition to using temperature to make magnetic alloys with better crystallographic orientation or high anisotropy, the reduction of magnetic film thickness is also used. This is usually accomplished by using alloys having high magnetic remnant moment (MrT), high orientation ratio (OR) and high magnetic saturation moment (Ms). Additionally, using alloys having uniform and small grain size help make media with such performance.

The problems with some of these techniques are that magnetic media having high coercivity (Hc) and high anisotropy is limited head writability. The increase of Hc from larger grain size also negatively affects the media signal to noise ratio. Although higher MrT orientation ratio can be achieved through texture and cleaning processes, the improvements are limited. Another approach for film thickness reduction is using high Ms alloy through reducing Cr atomic percentage. However, high Ms alloys with lower Cr at % usually has significant impacts on the grain segregation, which negatively affects the media by increasing the media noise. Although continuous grain size reduction improves signal to noise properties and is desirable, it is limited by media thermal decay due to superparamagnetic behavior. The nominal grain size for longitudinal media has been reduced to 10 angstroms or less with a grain distribution of 2-3 angstroms of standard deviation.

Materials having four elements CoCrPtB, as discussed with reference to FIG. 1 have been commonly used for magnetic layers of magnetic media. These materials have been optimized to have high Cr and enough B to improve the magnetic media. However, there is a limitation to the amount of optimization of these compositions that can be done because the Cr percentage has increased to the point that the materials are on the verge of being non-magnetic. Increasing the Cr and B percentage in these materials decreases the coercivity Hc and remnant moment Mrt of the magnetic media to the point that it is unusable.

Despite the improvements that have been made in reducing noise of recording media having high areal density there are still many problems that need to be addressed including making desirable thermally stable magnetic media with higher signal to noise ratios and narrow track recording widths. Therefore what is needed is a system and method that results in a thermally stable magnetic media for recording information that has high areal density and reduced noise.

SUMMARY OF THE INVENTION

This limitation is overcome by incorporating a five element CoCrPtB—X alloy in the magnetic media structure and depositing the CoCrPtB—X alloy as a layer on the structure using a pulsed direct current sputtering technique. The CoCrPtB—X alloy is a five-element alloy where X can be Ta, Hf, Nb, etc.

One embodiment of the invention includes a magnetic recording medium comprising, a non-magnetic substrate, a first layer comprising chromium on the non-magnetic substrate, a second layer comprising a Cr alloy, where the Cr can be CrW, CrMo, and CrTi, a third layer comprising a Co alloy, where the Co alloy can be CoCr, CoCrTa, and CoCrRu, a fourth layer comprising of five element alloy where the five element alloy can be CoCrPtBTa, CoCrPtBNb, and CoCrPtBHf, etc. and a fifth layer having a high magnetic moment saturation alloy. Additionally the fourth layer comprising the five-element alloy, which can be CoCrPtBTa, CoCrPtBNb, and CoCrPtBHf, etc. is grown using a pulsed direct current sputtering technique.

The pulsed direct current sputtering technique used to deposit the five-element alloy CoCrPtB—X where X=Ta, Nb, Hf, etc. can have a pulse frequency ranging from 50 KHz to 150 KHz, a reverse time ranging from 0.5 microseconds and 5 microseconds, and a duty cycle ranging from 50% to 100%.

Another embodiment of the present invention includes a method of making magnetic recording medium, comprising providing a substrate for depositing layers, depositing a first layer comprising Cr over the substrate, depositing a second layer, which is made of a material consisting of CrW, CrMo, or CrTi, over the first layer, depositing a third layer, which is made of CoCr, CoCrTa, or CoCrRu over the second layer, depositing a fourth layer, which is made of CoCrPtBTa, CoCrPtBNb, or CoCrPtBHf, over the third layer using a pulsed direct current sputtering technique and depositing a fifth layer made of a high magnetic moment saturation alloy over the fourth layer. The pulse direct current sputtering technique can have a pulse frequency ranging from 50 KHz to 150 KHz, a reverse time ranging from 0.5 microseconds and 5 microseconds, and a duty cycle ranging from 50% to 100%.

Other embodiments of the magnetic media structure and the method of making the magnetic media can include various thicknesses and compositions.

BRIEF DESCRIPTION OF THE INVENTION

DETAILED DESCRIPTION OF THE PREFERRED EMBODIMENTS

The invention provides a system and method for high areal density magnetic recording using multilayer magnetic media having significantly reduced medium noise.

Figure 1:
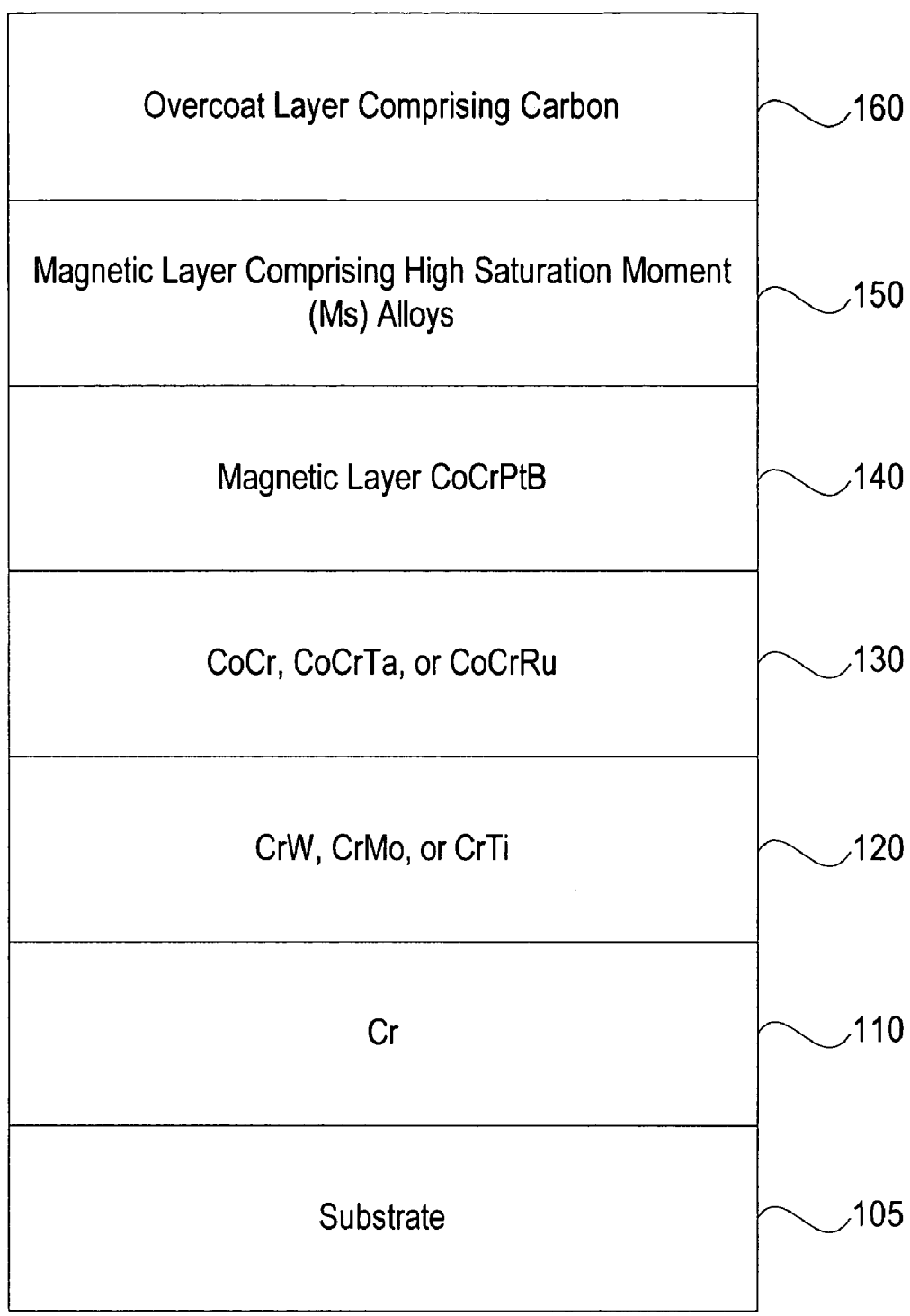
FIG. 1 is a block diagram showing a prior art conventional multilayer magnetic media structure.
Figure 2:
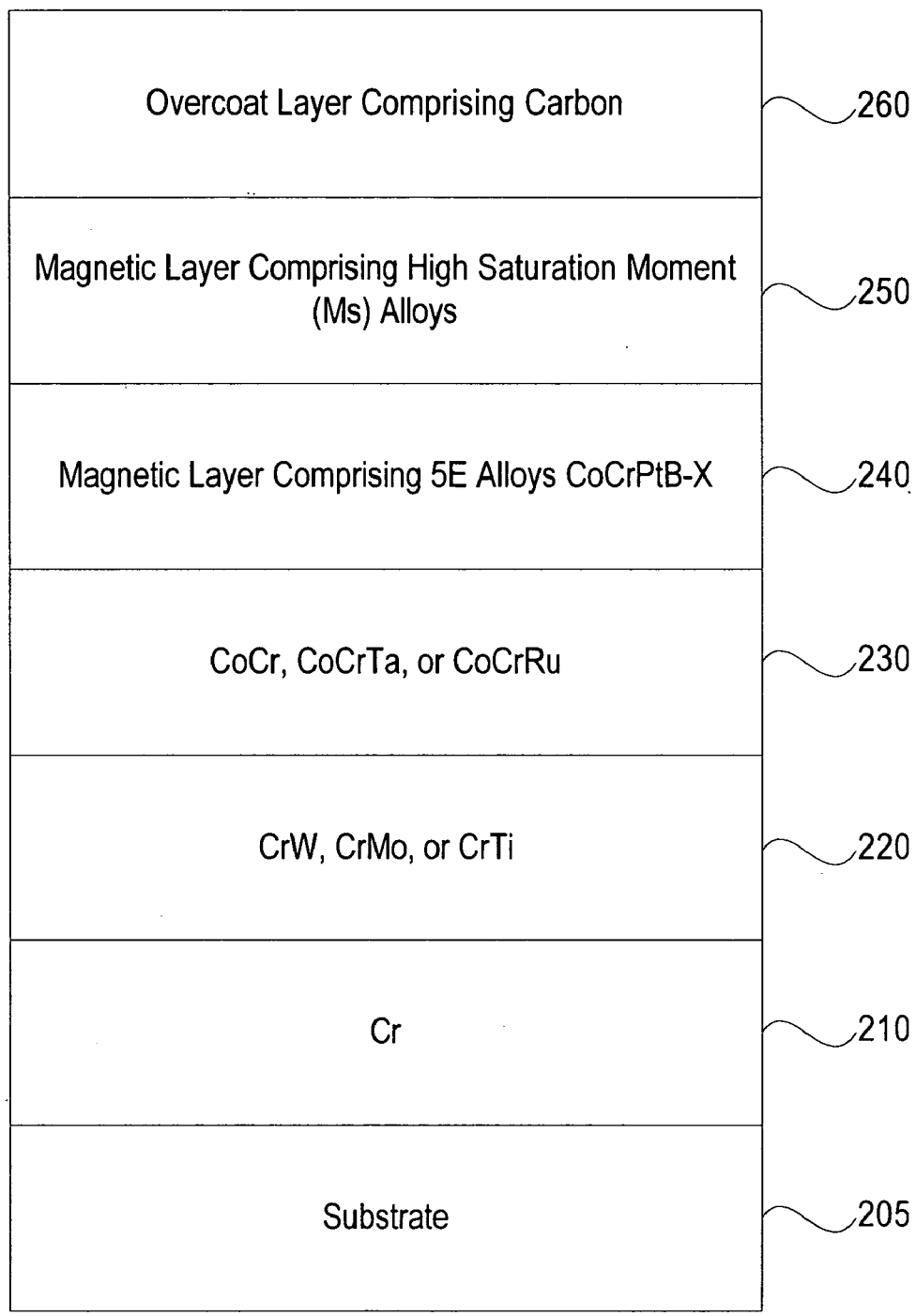
FIG. 2 is a block diagram showing a multilayer magnetic media structure having 5E alloys CoCrPtB—X where X=Ta, Nb, Hf, etc in accordance with one embodiment of the invention.

FIG. 2 illustrates a multilayer magnetic media structure 200 having a magnetic layer having 5 element (5E) alloys with composition CoCrPtB—X (where X=Ta, Nb, Hf, etc.), in accordance with one embodiment of the invention. Magnetic media structure 200 includes a substrate 205, a first layer 210 made of approximately 35 Å of chromium (Cr), a second layer 220 made of approximately 40 Å of chromium-tungsten (CrW), chromium-molybdenum (CrMo), chromium-titanium (CrTi), a third layer 230 made of approximately 20 Å of cobalt-chromium (CoCr), cobalt-chromium-tantalum (CoCrTa), or cobalt-chromium-ruthenium (CoCrRu), a fourth layer 240 made of approximately 80-90 Å of a magnetic layer with a five element (5E) alloy cobalt-chromium-platinum-boron-X (CoCrPtB—X) where X=Ta, Nb, Hf, etc., a fifth layer 250 made of approximately 80-90 Å of magnetic layer having a high magnetic saturation moment (Ms) such as CoCrPtB, and a sixth layer 260 made of approximately 35 Å of a carbon containing layer such as diamond-like-carbon (DLC).

Substrate 205 of magnetic media structure 200 is a non-magnetic material sufficiently thick to provide sufficient rigidity. Substrate 205 can be made out of Aluminum (Al), nickel-phosphorus (NiP) plated aluminum, Al—Mg based alloys, other aluminum based alloys, other non-magnetic metals, other non-magnetic alloys, glass, ceramic, polymers, glass-ceramics, and composites and/or laminates thereof. Additionally substrate 205 is typically textured to improve magnetic media performance in a disk drive.

In alternative embodiments the thicknesses and atomic percentages of the elements of the different layers can be varied. The thickness of the first layer 210 having Cr can be between 30 Å and 50 Å and is preferably around 40 Å. The thickness of the second layer 220 having CrW, CrMo and CrTi can be between 30 Å and 50 Å and is preferably around 40 Å. The thickness of the third layer 230 having CoCr, CoCrTa or CoCrRu can be between 10 Å and 30 Å and is preferably around 20 Å. The atomic percentage of Cr in the third layer 230 can be between 10 and 20 atomic percentage whereas the Ta or Ru percentage can be between 1 and 5 atomic percentage. The thickness of the fourth layer 240 having a magnetic layer with a five element (5E) alloy CoCrPtB—X (where X=Ta, Nb, Hf, etc.) can be between 60 Å and 110 Å and is preferably around 80-90 Å. The atomic percentages of the elements in the CoCrPtB—X fourth layer 240 can vary so that Cr can be between 20 and 28 atomic percentage, Pt can be between 10 and 15 atomic percentage, B can be between 2 and 10 atomic percentage, and X can be between 1 and 5 atomic percentage. Additionally, fourth layer 240 having the 5E alloy CoCrPtB—X is preferably deposited using a pulsed direct current sputtering technique as is further described with reference to FIG. 3 below. The thickness of the fifth layer 250 having a high saturation magnetic moment (Ms) alloy such as CoCrPtB can be between 60 Å and 110 Å and is preferably around 80-90 Å. The atomic percentages of the elements in the CoCrPtB alloy of the fifth layer 250 can vary so that Cr can be between 10 and 20 atomic percentage, Pt can be between 10 and 15 atomic percentage, B can be between 10 and 18 atomic percentage. The thickness of the sixth layer 260 containing carbon such as diamond-like-carbon can be between 25 Å and 45 Å and is preferably around 35 Å.

Fourth layer 240 which is made of CoCrPtB—X alloys contains CoCrPtB and the fifth element X which can be X=Ta, Nb, or Hf, etc. Table 1 lists some of the physical properties of the fifth element X in the CoCrPtB—X alloy as well as some physical properties of CoCrPtB. The three elements X=Ta, Nb, or Hf have high melting temperatures and large lattice parameters compared to CoCrPtB alloys. The addition of these fifth non-soluble elements into the CoCrPtB alloy promotes the physical grain-size refinement.

TABLE 1

Properties of fifth elements in CoCrPtB alloys

|  | CoCrPtB | Ta | Nb | Hf |
|---|---|---|---|---|
| Structure and lattice parameters (Å) | HCP<br>a~2.50<br>c~4.07 | BCC<br>a = 3.30 | BCC<br>a = 3.31 | HCP<br>a = 3.20<br>c = 5.05 |
| Melting temperature (° C.) | <2000 | 3293 | 2742 | 2504 |

Figure 3:
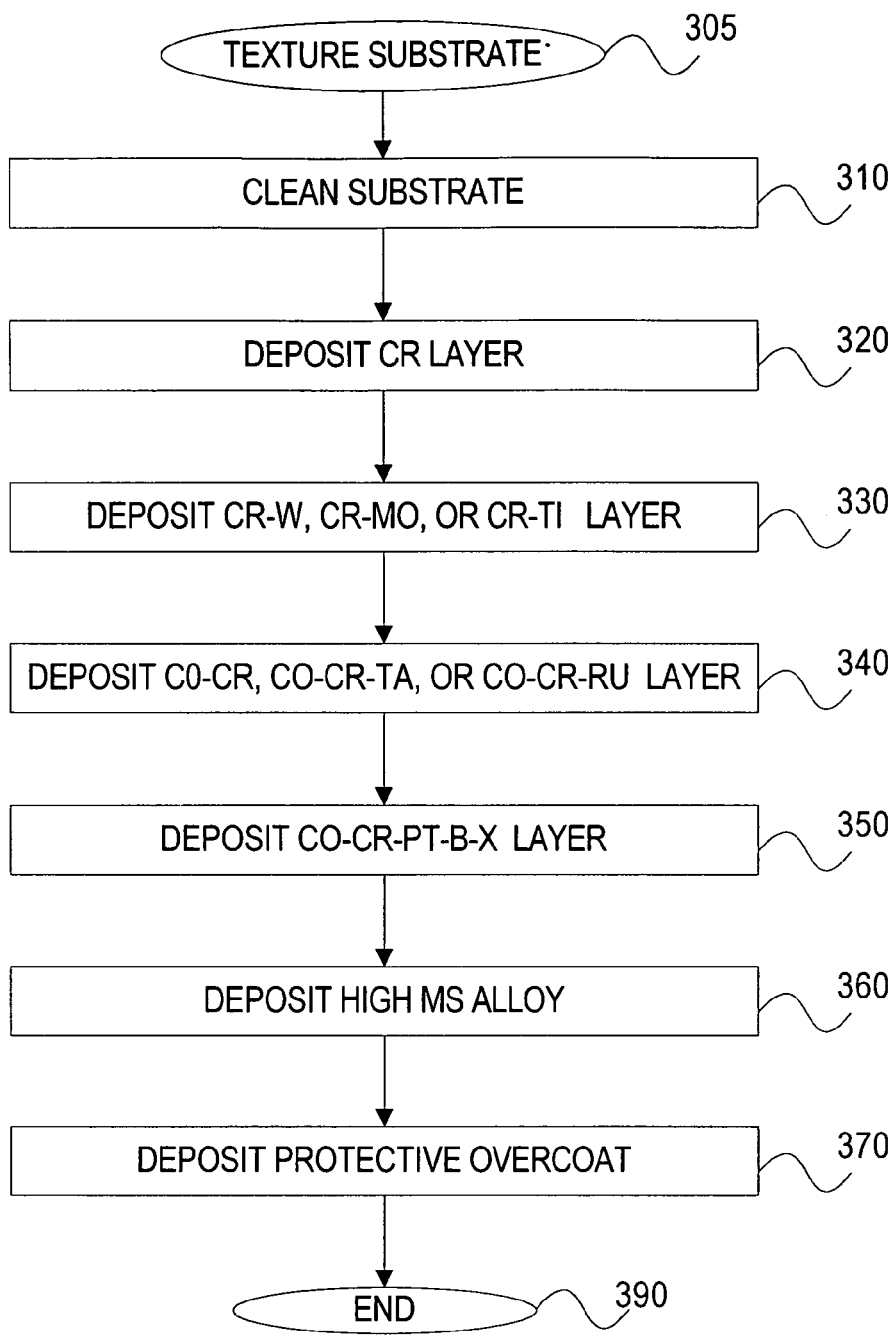
FIG. 3 is a flowchart illustrating the preferred method of making magnetic media structure 200.

FIG. 3 is a flowchart illustrating the preferred method of making magnetic media structure 200 which comprises a Cr and CrX (X=W, Mo or Ti) dual underlayers, a CoCr, CoCrTa or CoCrRu intermediated layer, a CoCrPtB—X and CoCrPtB dual magnetic layers epitaxially grown thereon, and a NiP plated aluminum substrate having texture with an average surface roughness (Ra) of approximately 2.3 angstroms. All of the layers except the layer having CoCrPtB—X, deposited on the NiP coated substrate, can be grown by using DC magnetron sputtering techniques. The CoCrPtB—X alloy is deposited using a pulsed power supply. Variable pulsed frequency from 50 KHz to 150 KHz was applied. The reverse time was set between 0.5 microseconds to 5 microseconds to have a duty cycle from 50% to 100%. The system vacuum used to deposit the layers was at low $10^{-7}$ torr base pressure. The substrate was pre-heated to 280° C. before sputter and the sputter pressure was maintained at a level from 4 mtorr to 10 mtorr with substrate bias at −250 Volts.

First in step 305 a substrate 205 is textured prior to cleaning. In step 305, the glass substrate is textured/polished, using conventional mechanical polishing processes, to have a surface roughness of less than 10 Å. The preferred average surface roughness (Ra) is less than 5 Å and approximately 2.3 Å. Next in step 310 the substrate is cleaned using a conventional glass cleaning procedure-involving combinations of acids, detergents, alcohol, solvents and water. This step cleans the substrate 205 of any residue left over from the texturing/polishing process and prepares the substrate 205 for the subsequent thin film deposition process.

In step 320, the first layer 210 having chromium is deposited onto the substrate using conventional thin film growth techniques and a single target made out of Cr. In one embodiment the first layer 210 was deposited using sputtering in an in-line machine with a DC magnetron apparatus. Before the first layer 210 is deposited, the textured and cleaned substrate is loaded into a vacuum chamber that has been pumped out to a base pressure of at least $10^{-6}$ torr and preferably $10^{-7}$ torr. The substrate can then be pre-heated to an elevated temperature before the first layer 210 is sputter deposited on the cleaned and textured substrate. In one embodiment this elevated temperature is approximately 280° C. During the deposition process of the first layer 210 as well as the other layers pressure was maintained at a level from 4 mtorr to 12 mtorr and the substrate was maintained at a bias voltage of −250 Volts. Adjusting the power and/or adjusting the sputtering time controls the thickness, which is approximately 30-50 Å, for the first layer, in this application. Although the gas used for sputtering can be any inert gas, argon is the preferred gas used to deposit first layer 210 as well as all of the subsequent layers.

Next in step 330 the second layer 220 having CrW, CrMo, or CrTi is deposited onto the first layer 210 having Cr. The second layer 220 is deposited in the same deposition apparatus as the first layer 210 was deposited and is usually accomplished by moving the substrate in front of a CrW, CrMo, or CrTi target or moving the CrW, CrMo, or CrTi target in front of the substrate and striking a plasma resulting in the deposition of the CrW, CrMo, or CrTi second layer 220 on the first layer 210 containing Cr. This process is done without taking the substrate out of the vacuum chamber.

Next in step 340 the third layer 230 having CoCr, CoCrTa, or CoCrRu is deposited onto the second layer 220 having CrW, CrMo, or CrTi. The third layer 230 is deposited under substantially the same conditions and apparatus as the first layer 210 and second layer 220 were deposited. This is accomplished by moving the substrate in front of a CoCr, CoCrTa, or CoCrRu target or moving the CoCr, CoCrTa, or CoCrRu target in front of the substrate and striking a plasma resulting in the deposition of the CoCr, CoCrTa, or CoCrRu third layer 230 on the second layer 220 having CrW, CrMo, or CrTi. This process is done without taking the substrate out of the vacuum chamber.

Next in step 350 the fourth layer 240 having CoCrPtB—X (where X=Ta, Nb, Hf, etc.) is deposited onto the third layer 230 having CoCr, CoCrTa, or CoCrRu . The fourth layer 240 is deposited under substantially the same conditions and apparatus as the prior layers with the exception that a pulsed power supply is used to supply power to the CoCrPtB—X target. This is accomplished by moving the substrate in front of a CoCrPtB—X target or moving the CoCrPtB—X target in front of the substrate and striking a plasma resulting in the deposition of the CoCrPtB—X fourth layer 240 on the third layer 230 having CoCr, CoCrTa, or CoCrRu. This process is done without taking the substrate out of the vacuum chamber. Additionally, the fourth layer 240 having CoCrPtB—X alloy is deposited using a pulsed power supply with a variable pulsed frequency ranging from 50 KHz to 150 KHz, as is further discussed with reference to FIG. 4 below. The reverse time was set between 0.5 microseconds and 5 microseconds with a duty cycle from 50% to 100%.

Next in step 360 the fifth layer 250 having a high magnetic saturation Ms alloy such as CoCrPtB is deposited onto the fourth layer 240 having CoCrPtB—X. The fifth layer 250 is deposited under substantially the same conditions and apparatus as the first layer 210 and second layer 220 were deposited. This is accomplished by moving the substrate in front of a high magnetic moment saturation Ms alloy target or moving the high magnetic moment saturation Ms alloy target in front of the substrate and striking a plasma resulting in the deposition of the high magnetic moment saturation Ms alloy fifth layer 250 on the fourth layer 240 having CoCrPtB—X. This process is done without taking the substrate out of the vacuum chamber. Next in step 370, an overcoat layer having carbon 260 is deposited over the high magnetic moment saturation Ms alloy layer. The overcoat layer having carbon 260 is preferably diamond-like-carbon which is carbon and hydrogen and is chosen because of its wear resistant properties. Finally the process ends in step 390 where the finished media is unloaded out of the vacuum chamber and processed.

Figure 4:
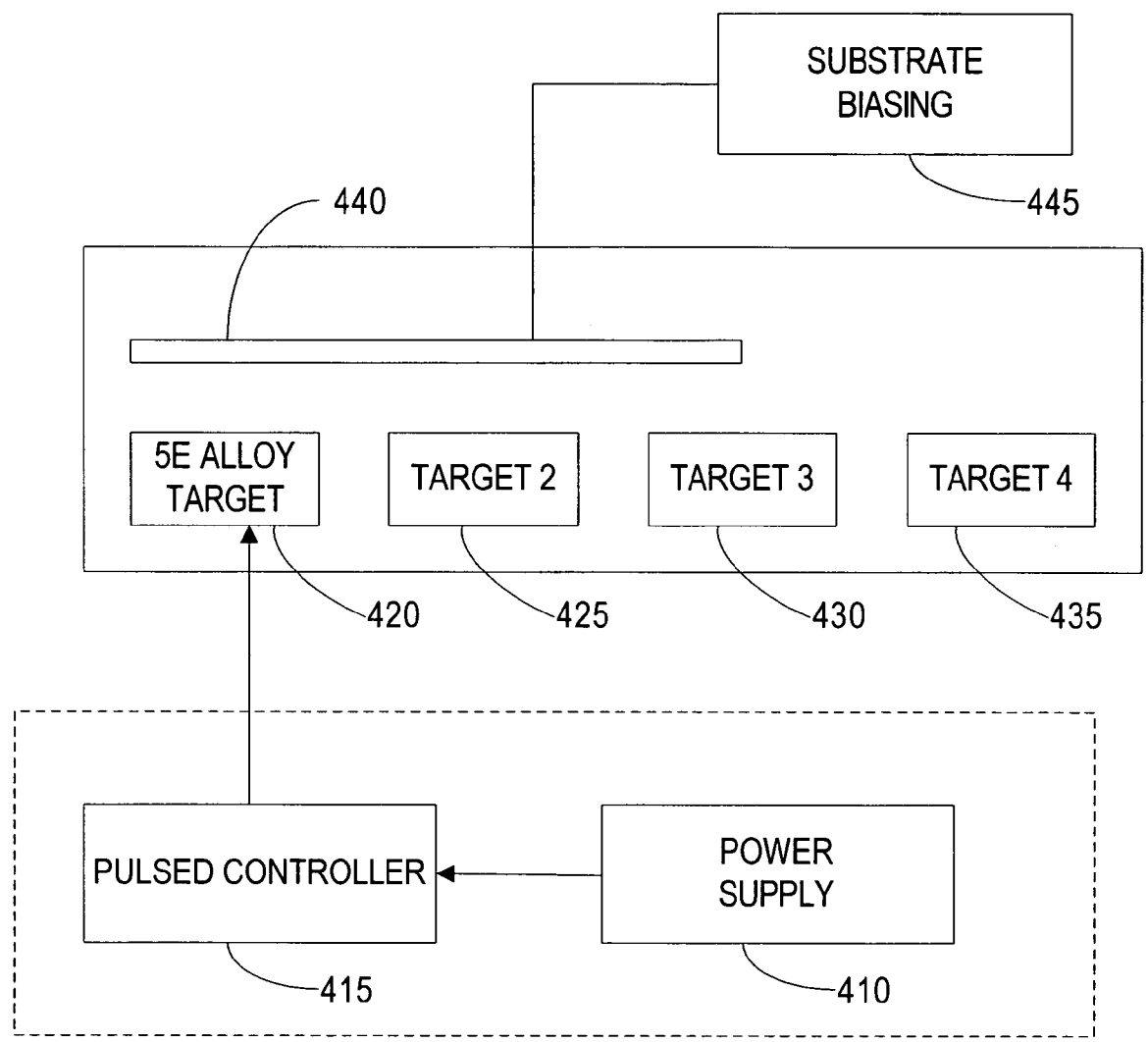
FIG. 4 is a block diagram showing an apparatus having a power supply setup of pulsed sputtering used to make the magnetic media structure 200.

FIG. 4 is a block diagram showing a configuration of a power supply for pulsed sputtering used to supply power to the 5E alloy CoCrPtB—X target including a power supply 410, a pulse controller 415, a first target 420 comprising a 5E alloy CoCrPtB—X material, a second target 425, a third target 430, a fourth target 435, a substrate holder 440 holding at least one disk, and a substrate biasing power supply 445 for biasing said substrate holder 440. Typically the power supply 410 is a direct current (DC) power supply source that is connected to the first target 420. In one embodiment of the invention, a pulsed controller 415 (Sparcle-V) was added between the first target 420, having a 5E alloy CoCrPtB—X alloy, and the power supply 410 to provide middle frequency power sources. In another embodiment a power supply, having built-in advanced pulsed DC capabilities, such as a Pinnacle™ Plus+ Pulsed DC power supply, can be used. Such a configuration provides a middle frequency ranging from 5 KHz to 350 KHz. Variable duty cycle could be setup from frequency and reverse time. In the embodiment shown, the pulsed controller power supply is only connected to the first 5E alloys target.

Figure 5:
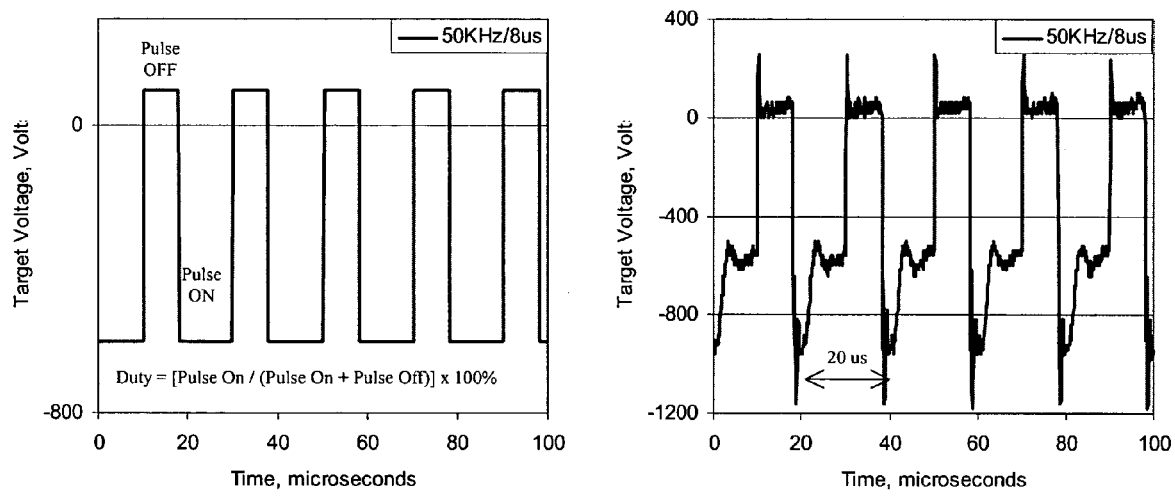
FIG. 5 shows the target voltage as a function of time for the power supply used in FIG. 4.

FIG. 5 shows the target voltage as a function of time for the power supply used in FIG. 4. The frequency is set at 50 KHz with a reverse time of 8 microseconds. The pulsed time for power on and off is 12 microseconds and 8 microseconds alternatively. The duty cycle time therefore is 60%. The first diagram is an illustration showing the desired pulse wave set-up whereas the second diagram is an actual output of a pulsed direct current sputtering power supply.

Figure 6A:
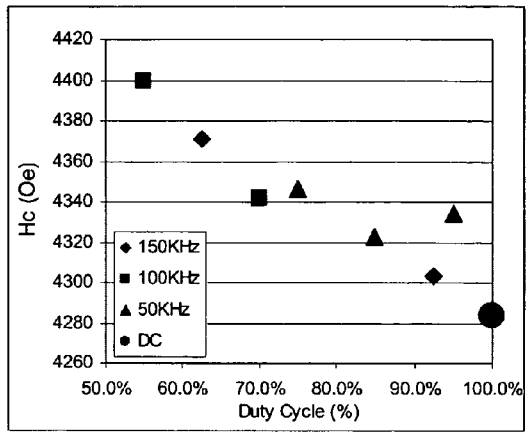
FIG. 6A shows the coercivity (Hc) dependence of the magnetic media structure 200 on the power supply duty cycle used for pulse sputtering.
Figure 6B:
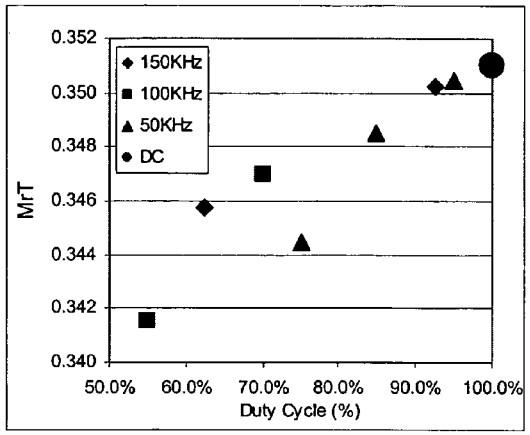
FIG. 6B shows the (remnant moment)×(thickness) (MrT) dependence of the magnetic media structure 200 on the power supply duty cycle used for pulse sputtering.
Figure 6C:
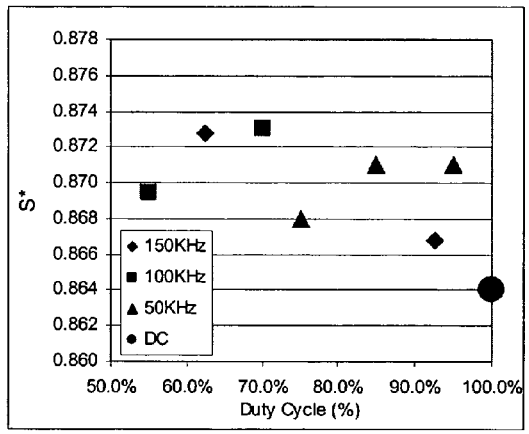
FIG. 6C shows the squareness (S*) dependence of the magnetic media structure 200 on the power supply duty cycle used for pulse sputtering.
Figure 6D:
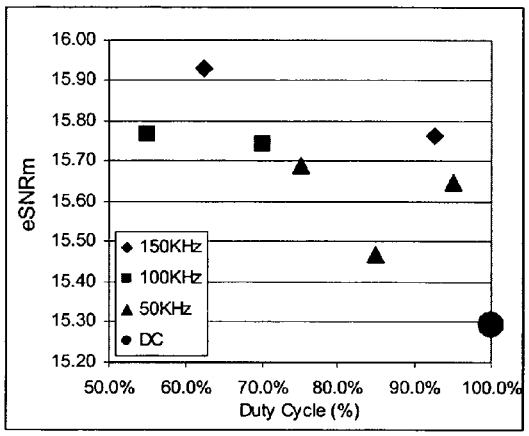
FIG. 6D shows the signal to noise ratio (eSNRm) dependence of the magnetic media structure 200 on the power supply duty cycle used for pulse sputtering.

FIGS. 6A-6D show the magnetic properties of the media structure 200 made with the pulsed power supply discussed with reference to FIG. 4 above, in accordance with one embodiment of the invention. FIG. 6A shows the coercivity (Hc) dependence of the magnetic media structure 200 on the power supply duty cycle used for pulse sputtering. FIG. 6B shows the (remnant moment)×(thickness) (MrT) dependence of the magnetic media structure 200 on the power supply duty cycle used for pulse sputtering. FIG. 6C shows the squareness (S*) dependence of the magnetic media structure 200 on the power supply duty cycle used for pulse sputtering. FIG. 6D shows the signal to noise ratio (eSNRm) dependence of the magnetic media structure 200 on the power supply duty cycle used for pulse sputtering. All of the magnetic properties of media structure 200 were measured on a non-destructive turbo rotating disk magnetometer. The recording performance and equalized media signal to noise ratio was measured in a Guzik tester at 650 kbpi linear density and 395 Mbps data rate with a 105 ktpi GMR head.

The data shown in FIG. 6A-6D includes the measured coercivity Hc, MrT, S* and eSNRm in response to duty cycle percentage, respectively. The data in FIG. 6A and FIG. 6B show that higher Hc and lower MrT can be achieved by growing the 5E alloy CoCrPtB—X layer using pulsed sputter instead of using conventional DC sputtering techniques. With the reduction of duty cycle percentage from 100% to 50%, there is about 100 Oe Hc increase and 3% MrT reduction. As shown in FIG. 6C, there is a slight increase in S* when using pulsed sputtering. FIG. 6D shows an increase in eSNRm with the reduction of duty cycle percentage.

Table 2 shows data comparing the eSNR between two magnetic media structures having identical structures and substantially similar Hc and Mrt but sputter deposited with different sputter modes. The first structure contains a 5E alloy CoCrPtB—X layer that was deposited using conventional DC sputtering techniques whereas the second structure contains a 5E alloy CoCrPtB—X layer that was deposited using a pulsed sputter DC technique running at 150 KHz and 60% duty cycle, in accordance with one embodiment of the invention. Since both the first and the second structures have substantially similar Hc and MrT, the amplitude and overwrite are compatible. The data shows an improvement of 0.4 db eSNRm and 0.4 decade BER for the second magnetic media structure where the pulsed sputter DC technique was used to deposit the 5E alloy CoCrPtB—X layer. The application of pulsed sputtering techniques to deposit 5E CoCrPtB—X alloy layers achieves a magnetic media film structure with higher Hc possibly due to high in-plane anisotropy and low equalized media signal to noise ratios.

TABLE 2

Magnetic property and performance comparison between DC and pulsed sputter

| | Sputter mode for 5E alloy | | | | | | |
|---|---|---|---|---|---|---|---|
| | Hc | MrT | S* | MFA | OW | eSNRm | BER |
| DC Sputter for 5E Alloy | 4711 | 0.351 | 0.873 | 1.497 | 36.51 | 15.27 | 5.30 |
| Pulsed Sputter for 5E alloy (150 KHz, 60% duty cycle) | 4675 | 0.354 | 0.867 | 1.518 | 36.58 | 15.69 | 5.70 |

Performance of magnetic media is improved by applying pulsed sputter techniques to deposit layers of 5E CoCrPtB—X alloys. Although there is no proven mechanism to explain this improvement, one possible mechanism is that the application of pulsed sputtering techniques during the deposition of low moment 5E CoCrPtB—X alloys affects both the film growth as well as the grain segregation. The pulsed sputtering technique which uses high-energy bombardment enhances the grain segregation by moving more Cr from grain to grain boundary. The high-energy bombardment of species may affect the grain boundary and may influence the alignment and film orientation resulting in a high in-plan anisotropy having higher Hc.

The advantage of pulsed sputter with high-energy bombardments can extend to the sputtering of magnetic media deposition for non-conductive glass substrate. Since glass substrates are typically not biased to a voltage, pulse sputtering techniques can be used advantageously on glass substrates in addition to aluminum substrates.

It will also be recognized by those skilled in the art that, while the invention has been described above in terms of preferred embodiments, it is not limited thereto. Various features and aspects of the above-described invention may be used individually or jointly. Further, although the invention has been described in the context of its implementation in a particular environment and for particular applications, those skilled in the art will recognize that its usefulness is not limited thereto and that the present invention can be utilized in any number of environments and implementations.

We claim:

1. A magnetic recording medium, comprising:
a non-magnetic substrate;
a first layer comprising chromium adjacent the non-magnetic substrate;
a second layer comprising Cobalt adjacent the first layer;
a third layer having magnetic properties, said third layer further comprising a five element alloy CoCrPtB—X and said third layer grown using a pulsed direct current sputtering process having a duty cycle of between about 55% to about 75%; and
a fourth layer adjacent the third layer having a magnetic saturation moment,
wherein the magnetic recording medium has a higher signal-to-noise ratio than that of a comparative magnetic recording medium having layers with substantially similar composition as that of the magnetic recording medium except that a third layer of the comparative magnetic recording medium is grown using a direct current sputtering process.

2. The magnetic recording medium of claim 1 wherein the first layer is selected from the group consisting of CrW, CrMo and CrTi.

3. The magnetic recording medium of claim 1 wherein the second layer is selected from the group consisting of CoCr, CoCrTa and CoCrRu.

4. The magnetic recording medium of claim 1 wherein the third layer is selected from the group consisting of CoCrPtBTa, CoCrPtBNb, and CoCrPtBHf.

5. The magnetic recording medium of claim 1 wherein said fourth layer is directly on said third layer.

6. The magnetic recording medium of claim 1 wherein said third layer contacts said second layer.

7. The magnetic recording medium of claim 1 further including a fifth layer between the substrate and the first layer, the fifth layer comprising Cr.

8. The magnetic recording medium of claim 1 further including a sixth layer comprising carbon adjacent said fourth layer.

9. A magnetic recording medium, comprising:
a non-magnetic substrate;
a first layer comprising chromium on the non-magnetic substrate;
a second layer comprising Cobalt on the first layer; and
a third layer having magnetic properties, said third layer further comprising a five element alloy CoCrPtB—X and said third layer grown using a pulsed direct current sputtering process having a duty cycle of between about 55% to about 75%;
wherein the magnetic recording medium has a higher signal-to-noise ratio than that of a comparative magnetic recording medium having layer substantially similar composition as that of the magnetic recording medium except that a third layer of the comparative magnetic recording medium is grown using a direct current sputtering process.

10. The magnetic recording medium of claim 9 further comprising a fourth layer on the third layer, the fourth layer comprising CoCrPtB.

11. A magnetic recording medium, comprising:
a non-magnetic substrate;
a first layer comprising chromium; a second layer comprising a Cr alloy,
a third layer comprising a Co alloy; and
a fourth layer comprising of a five element alloy selected from the group consisting of CoCrPtBTa, CoCrPtBNb, and CoCrPtBHf, and said fourth layer grown with pulsed direct current sputtering having a duty cycle of between about 55% to about 75%; and
a fifth layer comprising of a magnetic moment saturation alloy,
wherein the magnetic recording medium has a higher signal-to-noise ratio than of a comparative magnetic recording medium having a same structure as that of the magnetic recording medium except that a fourth layer of the comparative magnetic recording medium is grown using a direct current sputtering process.

12. The magnetic recording medium of claim 11, wherein said Cr alloy is selected from the group consisting of CrW, CrMo, and CrTi.

13. The magnetic recording medium of claim 11, wherein said Co alloy is selected from the group consisting of CoCr, CoCrTa, and CoCrRu.

* * * * *